United States Patent
Strong et al.

[11] Patent Number: 5,919,087
[45] Date of Patent: Jul. 6, 1999

[54] CONCAVE LATCH MECHANISM FOR AN AGRICULTURAL COMBINE

[75] Inventors: Russell W. Strong, Craftsbury Common, Vt.; Barry E. Lehman, York; Floyd W. Grove, New Holland, both of Pa.; Eric Cromheecke, Bredene, Belgium

[73] Assignee: New Holland North America, Inc., New Holland, Pa.

[21] Appl. No.: 08/963,572

[22] Filed: Nov. 6, 1997

[51] Int. Cl.⁶ ........................................... A01F 12/28
[52] U.S. Cl. ............................................ 460/72; 460/109
[58] Field of Search ........................ 460/72, 46, 71, 460/107, 108, 109, 110

[56] References Cited

U.S. PATENT DOCUMENTS

| | | | |
|---|---|---|---|
| 3,957,058 | 5/1976 | Komancheck | 460/108 |
| 4,711,075 | 12/1987 | Strong | 460/110 X |
| 4,711,252 | 12/1987 | Bernhardt et al. | 460/107 |

FOREIGN PATENT DOCUMENTS 4 218 610 A1   12/1993   Germany ........................ 460/109

*Primary Examiner*—Terry Lee Melius
*Attorney, Agent, or Firm*—J. William Stader; Larry W. Miller

[57] ABSTRACT

The disclosure relates to a concave latch mechanism for an agricultural combine. The invention consists of concave surrounding a rotor. The concave has a concave pin and an adjust pin. The adjust pin is inserted into a support slot located in the frame. The concave pin is inserted into a handle also located on the frame. The handle has a lever which orients a curved cradle plate which supports the concave pin. When the lever is released, the cradle plate correctly orients the concave pin with the handle. The concave pin enters the cradle plate through an aperture. The aperture can have a sloped lead-in which assists in the positioning of the concave pin. The handle can also have an isolation mount between a portion of the handle and the frame. This isolation mount helps minimize vibrational noise from the rotor.

14 Claims, 7 Drawing Sheets

CONCAVE LATCH MECHANISM FOR AN AGRICULTURAL COMBINE

BACKGROUND OF INVENTION

1. Field of Art

This invention relates to the improvement of an agricultural combine. More specifically it relates to an improvement of the concave latch for an agricultural combine.

2. Description of Prior Art

Mechanical harvesting of grain has taken place for decades. However, efforts continue in the attempt to make harvesting operations more efficient and effective. A combine harvester generally includes a head which cuts the crop. The head then moves the cut crop into a feeder house. The feeder house lifts the cut crop into the threshing and separation areas of the combine. The grain is separated from the stalk by a rotor or threshing system. The grain is then moved and stored in a grain tank. The chaff and trash are deposited from the rear of the combine. An operator usually runs these various operations from a glass-enclosed cab. Typically, the cab is located above and behind the head. Conventional and rotary threshing systems typically involve placing the grain between a spinning cylinder and a concave. The concave and cylinder possess protrusions or rubbing elements which rub the grain. This causes the grain to separate from the stalk. The distance between the concave and cylinder is a critical function. Depending on the type and hardness of the grain, the distance between the concave and cylinder is varied. Furthermore, it is often necessary to remove the concave for maintenance or for inserting or removing the rubbing elements. Because of the force placed on the concaves either by crops or the spinning cylinder, a concave typically is built for durability. Most concaves are heavy and difficult to position within a combine.

Most concaves are bolted onto the combine frame making their removal and installation a difficult undertaking. An additional difficulty with existing concaves is the vibrational noise created when the cylinder or rotor is rotating.

Consequently, the need exists for a mechanism which allows for the easy removal of a concave and minimizes the vibrational noise while the threshing system is operating.

OBJECTS OF THE INVENTION

It is an object of the present invention to provide an improved concave latch mechanism for an agricultural combine.

It is a further object of the present invention to provide a concave latch mechanism having an isolation mount so as to limit vibrational noise.

It is a further object of the present invention to provide a concave latch mechanism having a slot for adjusting the position of the latch mechanism.

It is a further object of the present invention to provide a concave latch mechanism having a handle with a cradle plate capable of supporting the concave.

It is a further object of the present invention to provide a concave latch mechanism with a handle whose motion is limited by the combine's side shield.

It is a further object of the present invention to provide a concave latch mechanism which allows the concave to be removed from the combine by rotating the handle upward.

It is a further object of the present invention to provide a concave latch mechanism which has a cradle plate with a slight lead-in portion to allow for the easy insertion of the concave pin.

It is a further object of the present invention to provide a concave latch mechanism which has a pair of parallel plates acting as a support slot for supporting the adjust pin of the concave.

It is a further object of the present invention to provide a. concave latch mechanism which has a handle pin which is shares the same axis as the concave pin.

It is a further object of the present invention to provide a concave latch mechanism which allows for the easy installation, removal and adjustment of the concave.

It is further object of the present invention to provide a concave latch mechanism for a twin rotor combine.

SUMMARY OF THE INVENTION

The invention overcomes the deficiencies of the prior art. The invention is a concave latch mechanism for a combine. The latch mechanism consists of a concave having an adjust pin and an opposing concave pin. The adjust pin is inserted into a support slot located on the frame. The concave pin is inserted into a handle. The handle is also attached to the frame. The handle has a lever which rotates portions of a hinge housing containing a curved cradle plate. The concave pin normally rests on the cradle plate. The cradle plate has an aperture which may be oriented upwards or downwards by manipulating the lever. The concave pin is inserted through the aperture while the lever is raised and is aligned with various hinge housing elements when the lever is lowered. To minimize vibrational noise created by the rotor an isolation mount is placed between the handle and frame. The aperture may also have a sloped lead-in to assist the placement of the concave pin into the aperture.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
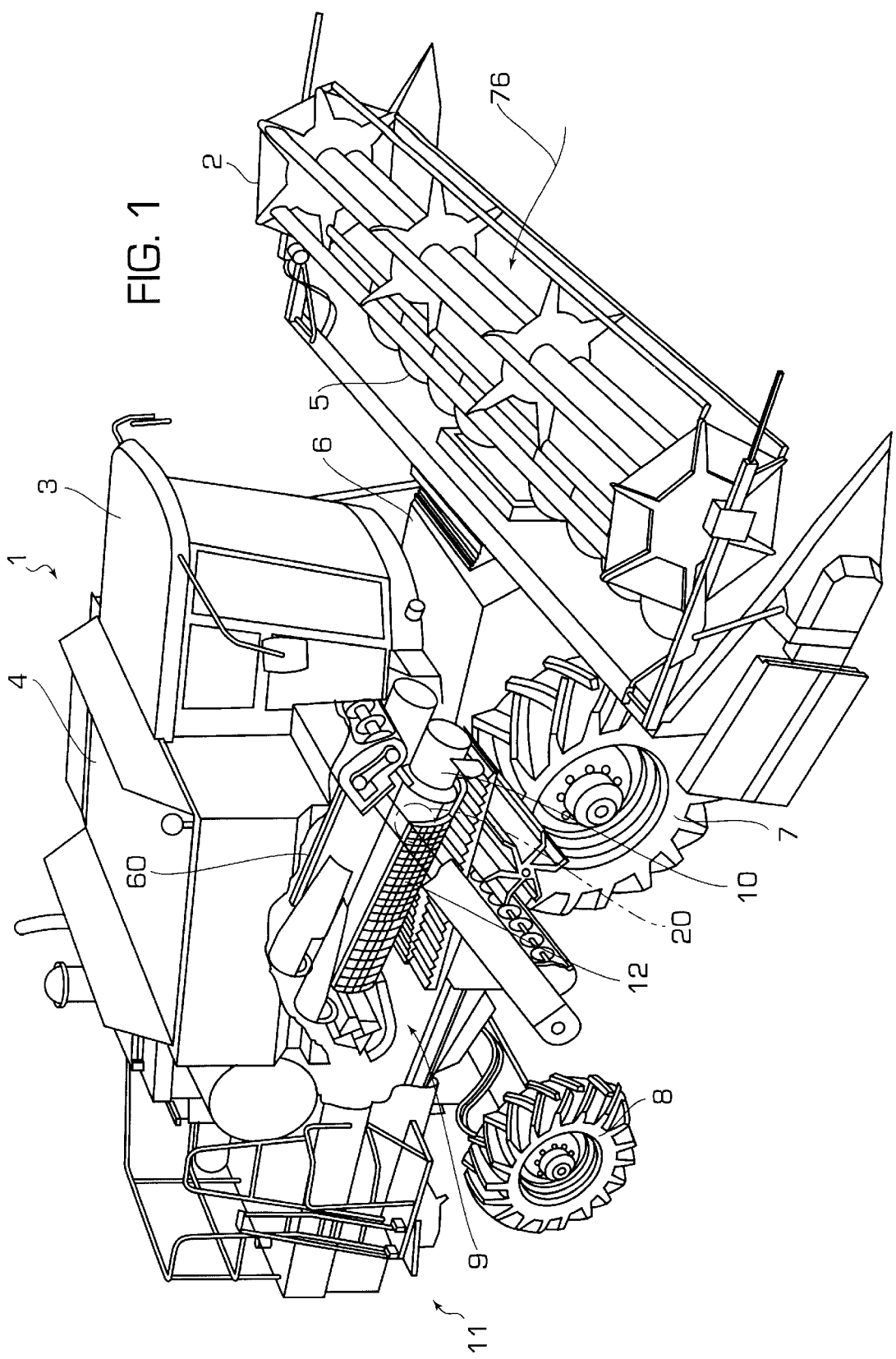
FIG. 1 is an elevation view of an agricultural combine with the threshing and separating area broken away to reveal the rotor, concave and cleaning shoes.

Referring to the drawings, it is possible to observe the major elements and general operation of the present invention. Left and right references are used as a matter of convenience and are determined by standing at the rear of the combine and facing the forward end in the normal direction of travel. Likewise, forward and rearward are determined by normal direction of travel of the combine. Upward or downward orientations are relative to the ground or operating surface. Horizontal or vertical planes are also relative to ground.

FIG. 1 illustrates a typical twin rotor combine 1 having a pair of front wheels 7 (only one shown) and a pair of rear wheels 8 (only one shown) for providing movement over the ground. At the front of the combine is a header 2 for cutting a crop. As the combine 1 and header 2 are moved forward, the grain and stalk are cut by the header. The header moves the grain into an auger trough. A transverse auger 5 pushes the grain and stalk in the auger trough to the center of the header. Located at the center of the header is the feeder 6 or elevator. The feeder 6 moves the grain and stalks rearward into the threshing, separation and cleaning systems 9 of the combine. After processing and separation, the processed grain is stored in a grain tank 4 located near the top of the combine. The grain is removed from the grain tank by an unloading auger (not shown). The trash or chaff is ejected from the rear 11 of the combine. The operator controls the combine 1 from the cab 3 located behind the header 2 and at the front of the combine. From the cab the operator can observe most the various combine functions. The cab 3 usually has a large glass window or several windows which afford the operator the maximum ability to monitor the header 2.

The present invention is a latch mechanism 20 is located near the separating and threshing system 9. In FIG. 1, the threshing, cleaning and separating system 9 uses a pair of parallel rotors 10. The axes of the rotors 10 are parallel to the flow of grain 76. Surrounding a portion of each rotor 10 is one or more concaves 12. Typically grain exits the feeder house and passes between the concave 12 and rotor 10. The spinning rotor 10 and stationary concave 12 act to rub the grain from the stalk. A typical rotor 10 is rotating at a high speed in a range of 600 to 1700 rpm depending on the crop being harvested. This results on a number of stresses being placed on the threshing system. As a result of these stresses the threshing system is typically crafted using heavy, durable materials. The weight and size of these components make installation, repair and replacement of various portions of the threshing and separating system difficult. Frequently it is necessary to alter the rotor configuration or add rubbing elements to the concave. The present invention improves access to the concave and rotors. The present invention generally consists of a latch mechanism 20 for supporting the concave 12. The latch mechanism is affixed to the frame 50. There can be a single latch mechanism per concave or several. Typically covering the entire area is a side shield 60 (partially cut-away).

Figure 5:
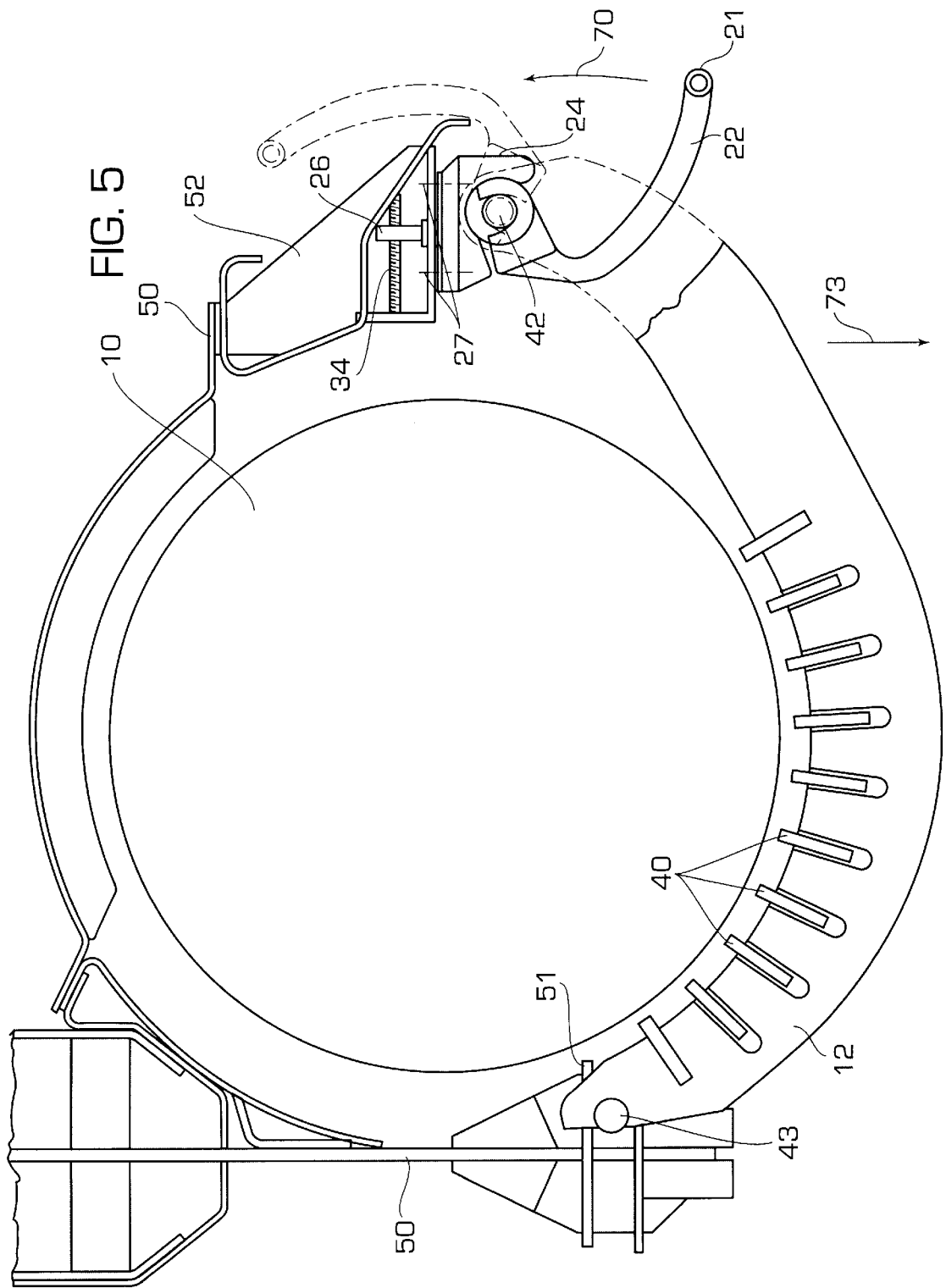
FIG. 5 is a front view of one side of the threshing and separating system without a rotor.
Figure 6:
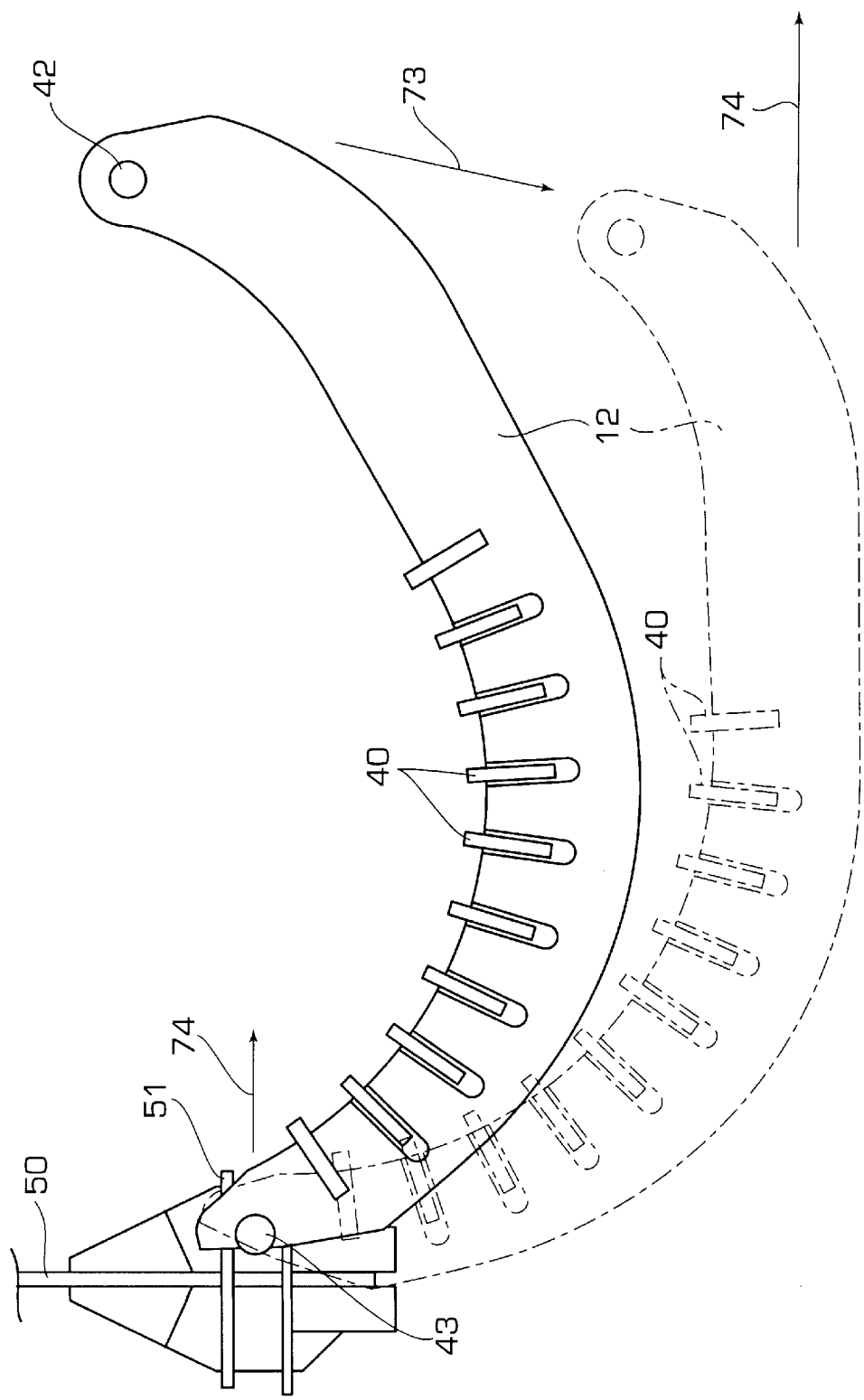
FIG. 6 is a front view of the concave without the handle indicating the movement of the concave.

As indicated previously, the latch mechanism 20 controls the movement and position of the concave 12, which is partially seen in FIG. 1. FIGS. 5 and 6 show a concave 12 surrounding a single rotor as viewed from a forward position. As seen in FIG. 5, the concave 12 is approximately arcuate and is constructed from heavy, durable materials. A plurality of rubbing bars 40 can be placed into the concave 12 to alter the rubbing of the grain between the rotor and concave 12. The concave 12 in the present invention has an adjust pin 43 for attaching the concave 12 to the inside frame assembly 50. This attachment means will be discussed in greater detail later. The opposite side of the concave 12 is ultimately attached to the frame 50 by a concave pin 42 which can be seen in FIGS. 6 or 7. The method of attaching the concave pin 42 to the frame will also be discussed later. The adjust pin 43 and concave pin 42 are circular, heavy-duty pins capable of supporting the concave as well as withstanding the stresses induced by normal combine operations. In the present invention, the pins are parallel to the flow of grain and the axis of the rotor.

The adjust pin 43 is attached to the frame 50 through a support slot 51 as seen in FIG. 5. The support slot 51 consists of a pair of parallel plates for receiving the adjust pin 43. As seen in FIG. 6, using the support slot 51 as an attachment means allows the concave 12 to be rotated 73 about the adjust pin 43. Alternatively, as illustrated in FIG. 6, the concave 12 may be lowered and then pulled away 74 from the support slot 51 and the center of the combine for removal.

Figure 7:
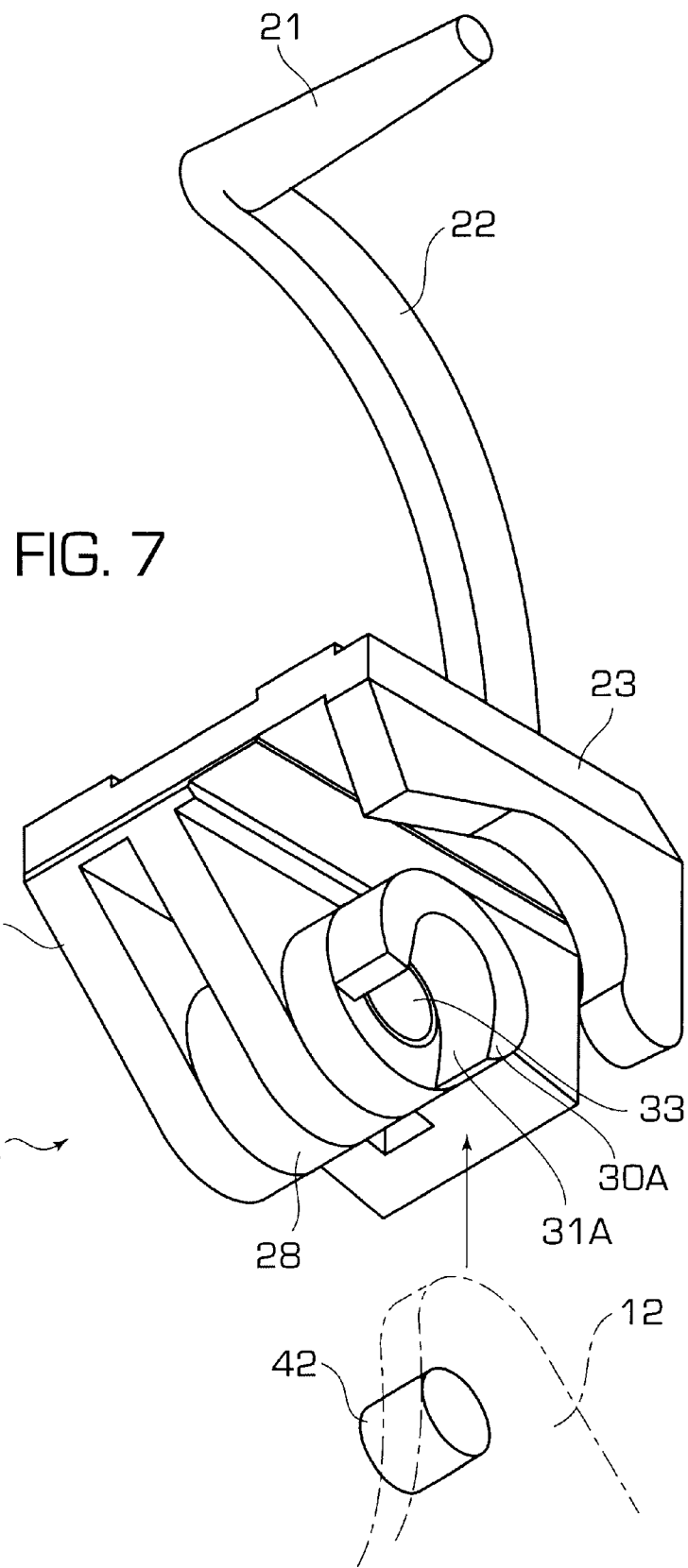
FIG. 7 is a bottom side view of the latch mechanism about to receive the concave pin.

The concave pin 42 is ultimately attached to the frame 50 by a hinge housing 24, as generally observed in FIG. 5. The hinge housing 24 is controlled by the motion 70 of a handle grip 21 and lever 22 which can also be generally observed in FIG. 5. Typically, the weight of handle grip 21 and lever 22 hold the grip 21 and lever 22 in a lowered position. However, the grip 21 and lever 22 can be rotated upwards 70, as illustrated by the phantom lines in FIG. 5. This rotation places the hinge housing 24 into the 'open' position permitting the concave pin 42 to enter or exit the hinge housing 24 (as seen in FIG. 7). Usually the weight of the handle grip 21 and lever 22 will bias the hinge housing into a closed position, however the side shield 60 (partially seen in FIG. 1) prevents the handle grip 21 or lever 22 from inadvertently rotating to an upwards position.

Figure 2:
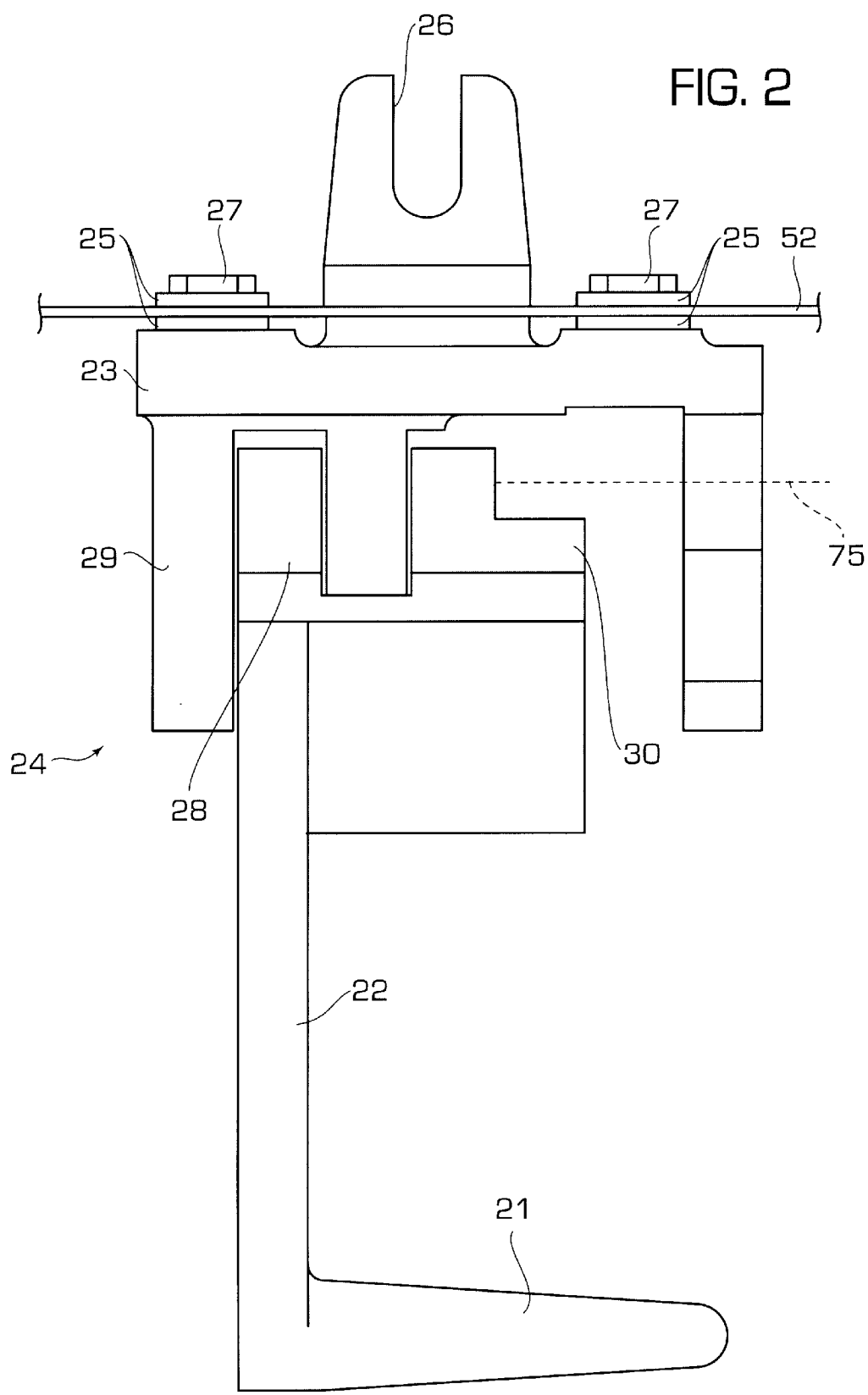
FIG. 2 is a side view of the handle.
Figure 3:
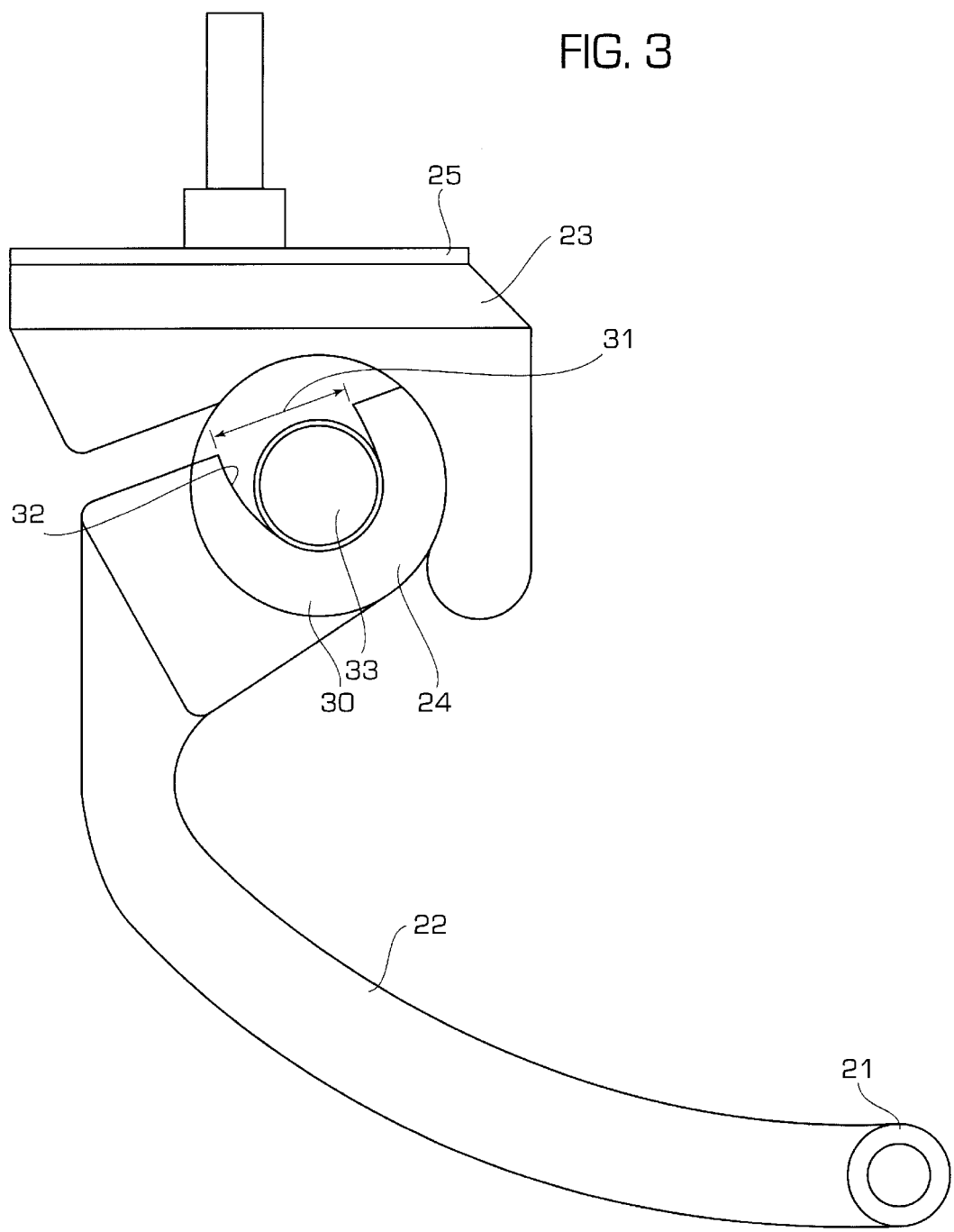
FIG. 3 is a front view of the handle in the closed position without a concave pin in the cradle plate.
Figure 4:
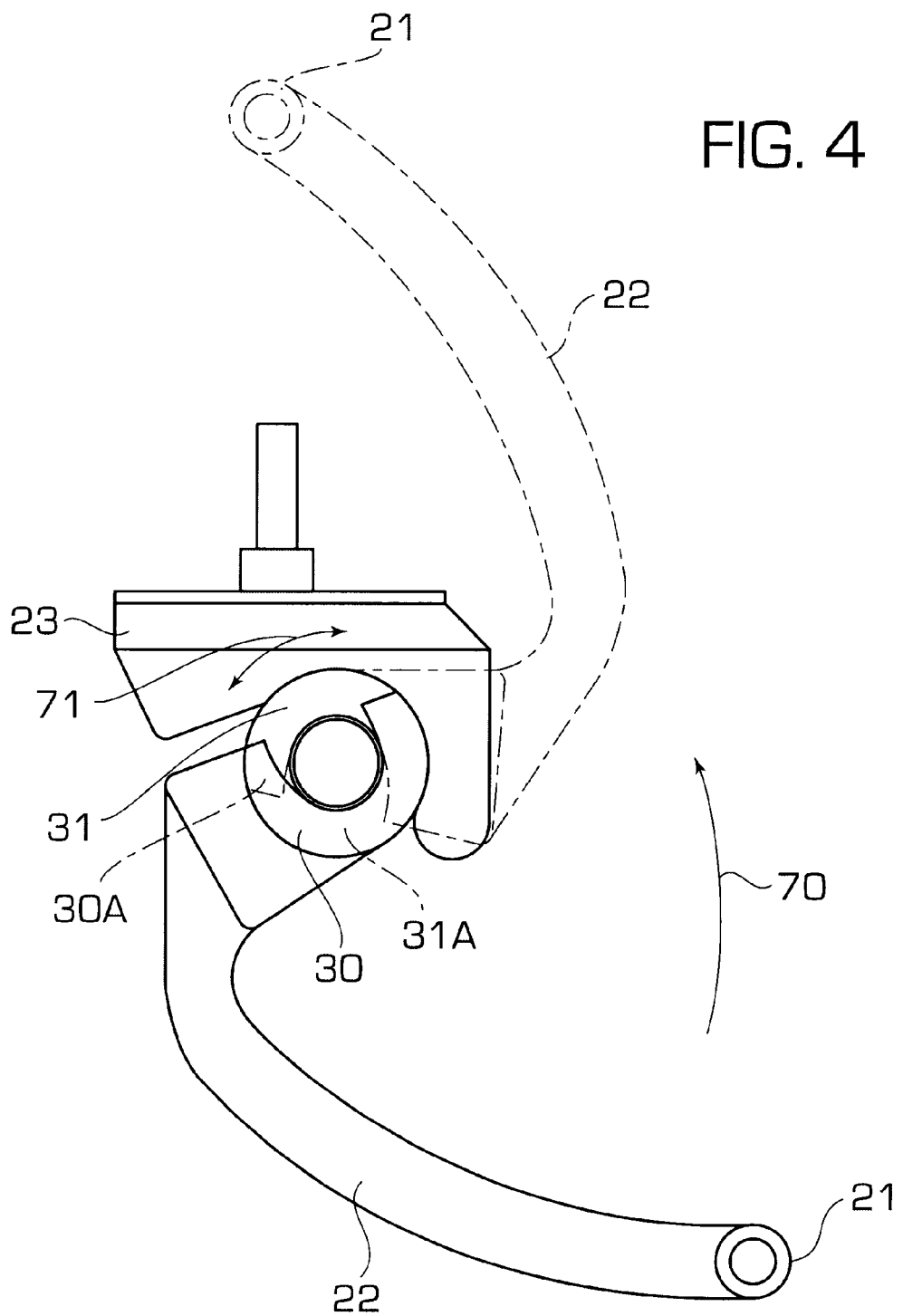
FIG. 4 is a front view of the handle showing the motion of the handle grip, lever, cradle plate and aperture.

The details of the hinge housing 24, lever 22 and handle grip be observed in FIGS. 2, 3 and 4. As seen in FIG. 2, the hinge housing 24 consists of an attachment hinge 29 and a handle hinge 28 which rotates about the handle pin 33 (as seen in FIG. 4). As seen in FIGS. 2 and 4, the rotation of the handle hinge 28 about the handle pin 33 is controlled by the lever 22. The attachment hinge 29 is affixed to the frame attachment 23. The frame attachment 23 is attached to the handle support 52 (seen in FIG. 5) which is attached to the frame 50. Extending from the handle hinge 28 is the curved cradle plate 30. The curved cradle plate 30 (as seen in FIGS. 2 and 3) has an aperture 31.

FIG. 5 illustrates how the hinge housing 24 can be adjusted relative to the handle support 52 and the frame 50 by means of a slot 26. Passing through the slot 26 is a threaded bolt 34. By adjusting the threaded bolt 34, the position of the frame attachment 72 relative to the frame 50 can be changed. It should be noted that this adjustment is primarily meant to be used during the initial installation of the latch mechanism 20 and concave 12. Attachment between the frame attachment 23 and the handle support 52 is accomplished by four positive retention studs 27 (only two shown). The handle support 52 has several slotted holes (not shown) for receiving and adjusting the studs 27. To minimize vibration between the concave 12 and frame 50, an elastic isolation mount 25 can be inserted between the frame attachment 23 and the handle support 52.

Normally, the concave pin 42 rests in the cradle plate 30. By lifting the handle grip 21 and lever 22 upwards, the cradle plate rotates 71 until the aperture 31 is oriented downwards 31A or into the 'open' position. This allows the concave pin 41, 42 to be removed or inserted into the cradle plate 30 (as seen in FIG. 7). Once the concave pin 41 exits the cradle plate 30, the concave moves downward 73. The concave 12 may then be pulled away from the combine 74. At this point, the adjust pin 43 will slide from the support slot 51 allowing the entire concave 12 to be removed from the combine.

To install the concave 12, the adjust pin 43 is inserted into the support slot 51. The handle grip 21 is rotated upwards 70, orienting the aperture 31 downwards 3 1A, again in the 'open' position. After the concave pin 42 is inserted through the aperture 31A and onto the cradle plate 30, the handle grip 21 can be released. As the aperture 31 moves to the upward position 71, the concave pin 42 and handle pin 33 will align onto a single axis 75. This axis 75 is parallel to the flow of grain through the concave and rotor. As previously noted, in a secondary embodiment, a portion of the aperture can be slightly sloped to assist in the insertion of the concave pin 42 into the cradle plate 30. However, it is important not to slope this 'lead-in' portion too greatly. This would allow the concave pin 42 to vibrate while the rotor was spinning.

During farming operations, the weight of the concave pin 42 against the cradle plate 30 will prevent the lever 22 and handle grip 21 from rotating and inadvertently opening. However, the side shield 60 will impede the motion of the lever and grip.

It will be obvious to those skilled in the art that various changes may be made without departing from the scope of the invention and the invention is not to be considered limited to what is illustrated in the drawings and described in the specification.

What is claimed is:

1. A concave latch mechanism for an agricultural combine comprising:
   a. a curved frame having a support slot and a handle support;
   b. a concave having an adjust pin and a concave pin, said concave and said frame surrounding a rotor; said adjust pin inserted into the support slot; and
   c. a hinge housing attached to the handle support, said housing having a curved cradle plate with an aperture, therein, said plate capable of receiving the concave pin, wherein the curved frame, the concave and the rotor are parallel to a flow of grain, wherein the hinge housing further comprises:
      i. a lever with a handle grip said lever attached to the hinge housing;
      ii. a frame attachment affixed to the hinge housing;
      iii a handle hinge affixed to the lever;
      iv an attachment hinge affixed to the frame attachment; and
      v a handle pin inserted between the attachment hinge and handle hinge, whereby the handle hinge rotates about the attachment hinge.

2. The concave latch mechanism for an agricultural combine described in claim 1, therein the said cradle plate is affixed to the handle hinge and said aperture has a slight lead-in portion, whereby the aperture is rotated by the movement of the handle hinge and the concave pin may exit the cradle plate through the aperture.

3. The concave latch mechanism for an agricultural combine described in claim 2, wherein said frame attachment further comprises a positive retention stud for affixing the frame attachment to the handle support.

4. The concave latch mechanism for an agricultural combine described in claim 3, wherein said frame attachment further comprises a slot, therein and said slot having a threaded bolt slideably contacting therein, whereby the position of the frame attachment relative to the handle support can be changed.

5. The concave latch mechanism for an agricultural combine described in claim 4, further comprising an isolation mounting between the frame attachment and handle attachment, whereby vibration between the concave and frame is minimized.

6. The concave latch mechanism for an agricultural combine described in claim 5, wherein the support slot further comprises a pair of parallel plates into which the adjust pin is inserted whereby when the concave pin exits the cradle plate, the adjust pin slides from the support slot allowing the concave to be removed from the combine.

7. The concave latch mechanism for an agricultural combine described in claim 6, wherein the rotation of the lever and the handle grip is impeded by a side shield.

8. The concave latch mechanism for an agricultural combine described in claim 7, herein the concave pin is removed from the cradle plate through the aperture when the lever is rotated upwards.

9. The concave latch mechanism for an agricultural combine described in claim 8, wherein the concave pin, while supported by the cradle plate, has a common axis with the handle pin, said axis being parallel to a flow of grain.

10. In a combine harvester, said combine having a header operationally connected to a threshing and separating system, said threshing and separating system having a rotor surrounded by a concave and curved frame. said rotor being parallel to a flow of grain, the improvement comprising:
   a. said frame having a support slot and a handle support, said support slot further comprising a pair of parallel plates;
   b. said concave having an adjust pin and a concave pin, said adjust pin inserted into the support slot;
   c. a hinge housing attached to the handle support. said housing having a curved cradle plate with an aperture, therein, said plate capable of receiving and supporting the concave pin; and
   d. an isolation mount affixed between a handle and a handle attachment, wherein the handle further comprises:
      i. a lever with a handle grip and said lever affixed to the hinge housing;
      ii. a frame attachment affixed to the hinge housing;
      iii. said hinge housing having a handle hinge affixed to the lever;
      iv. an attachment hinge affixed to the frame attachment;
      v. a handle pin inserted between the attachment hinge and handle hinge; and
      vi. said concave pin, while supported by the cradle plate has a common axis with the handle pin, said axis being parallel to a flow of grain.

11. The improvement described in claim 10 wherein said frame attachment further comprises a slot, therein and said slot having threaded a bolt slideably contacting, therein, whereby the position of the frame attachment relative to the handle support can be changed.

12. The improvement described in claim 11, wherein the handle grip is held in position by the side shield.

13. The improvement described in claim 12, wherein the concave pin is removed from the cradle plate through the aperture when the lever is rotated upwards and when said concave pin exits the cradle plate, the adjust pin can be removed from the support slot allowing the concave to be removed from the harvester.

14. The improvement described in claim 13, wherein said frame attachment further comprises a positive retention stud for affixing the frame attachment to the handle support.

* * * * *